Oct. 9, 1962 W. C. BUBNIAK ETAL 3,057,604
ROTARY REGENERATOR
Filed Jan. 16, 1956 4 Sheets-Sheet 1

INVENTORS
William C. Bubniak,
James M. Ricketts,
Roger W. Haushalter,
William A. Turunen, &
Paul T. Vickers
BY Paul Kilpatrick
ATTORNEY Oct. 9, 1962 W. C. BUBNIAK ETAL 3,057,604
ROTARY REGENERATOR
Filed Jan. 16, 1956 4 Sheets-Sheet 2
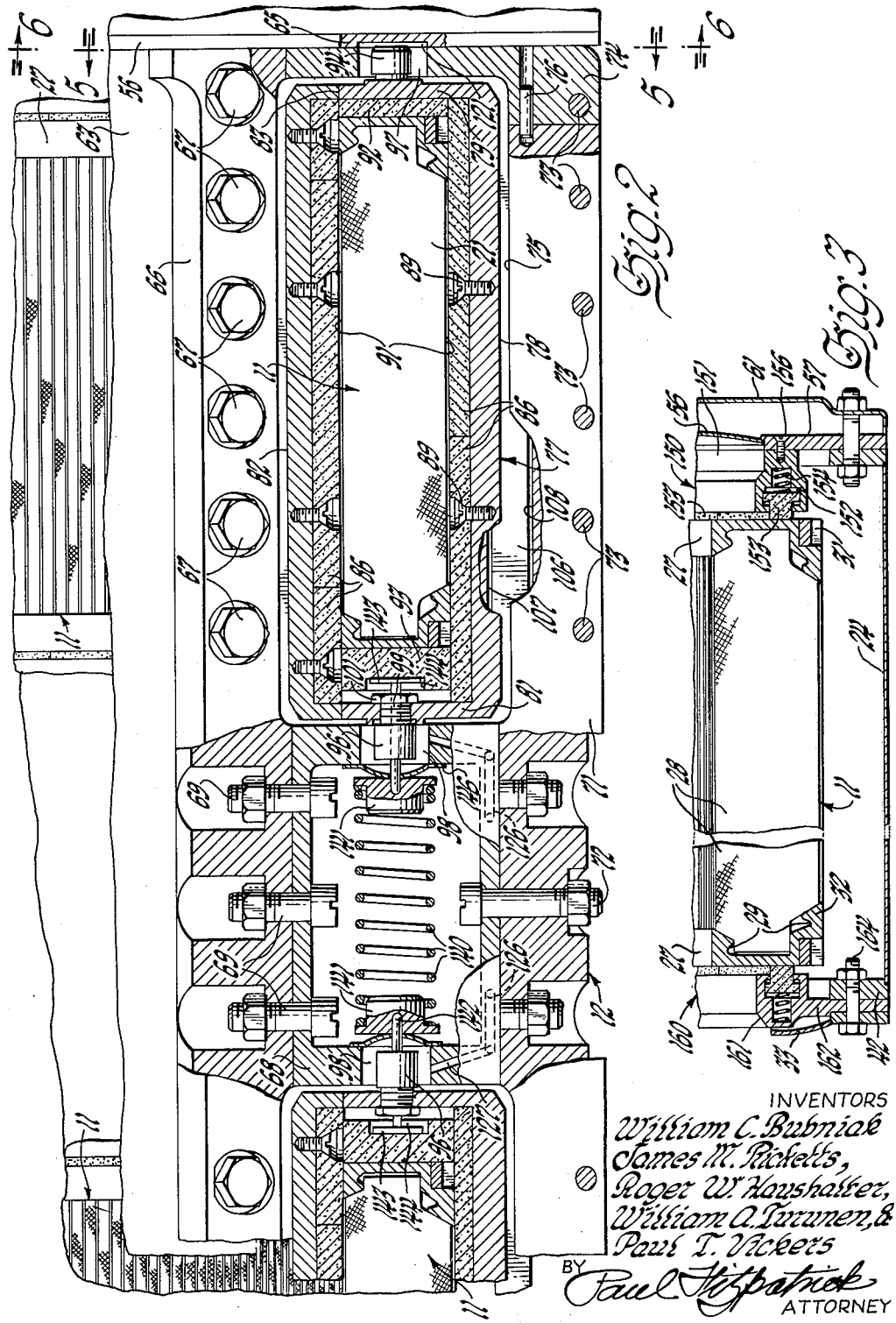
INVENTORS
William C. Bubniak
James M. Ricketts,
Roger W. Houshalter,
William A. Turunen, &
Paul T. Vickers
BY Paul Fitzpatrick
ATTORNEY

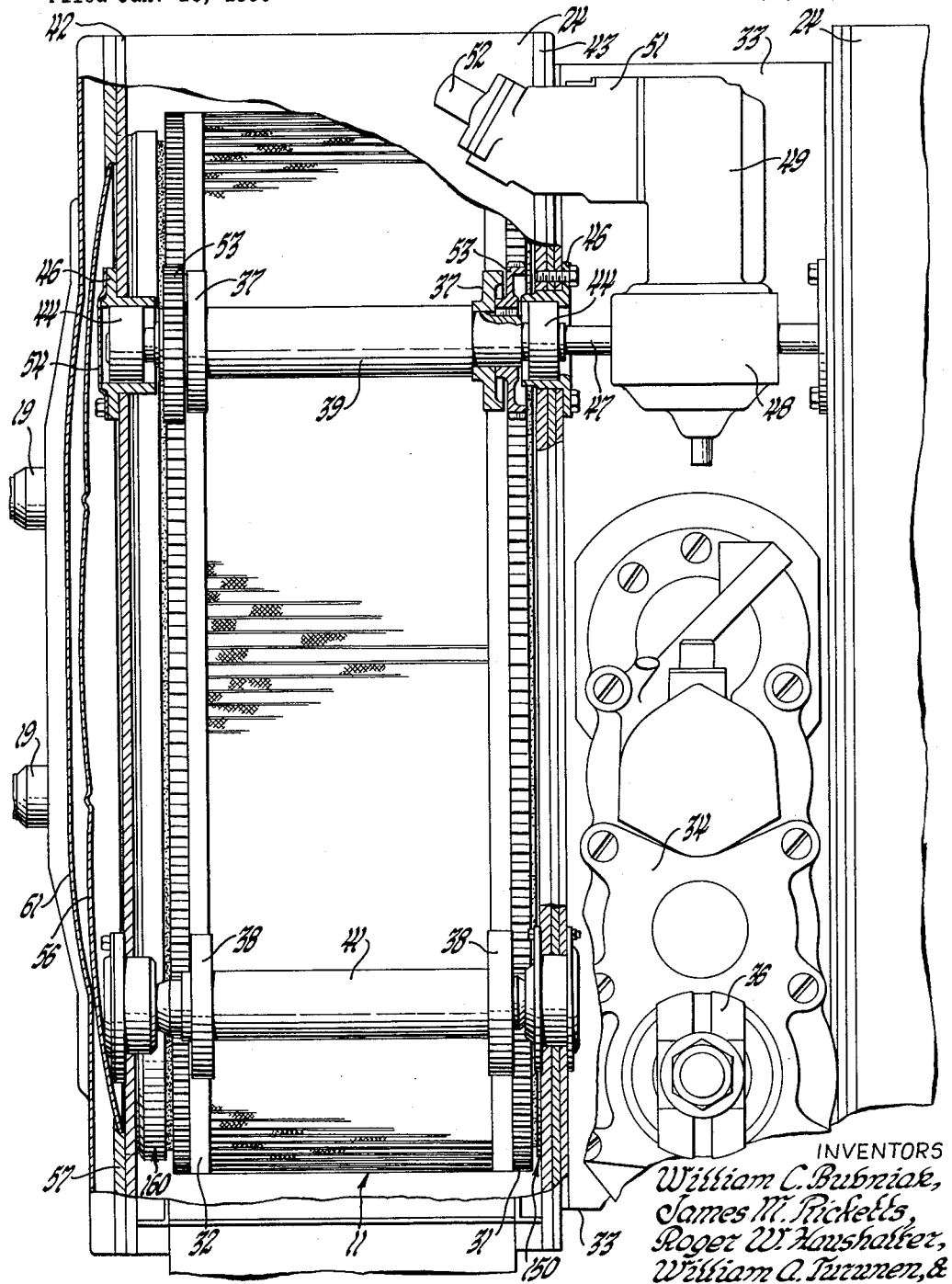

3,057,604
ROTARY REGENERATOR
William C. Bubniak, Detroit, Roger W. Haushalter, St. Clair Shores, James M. Ricketts, Oxford, William A. Turunen, Birmingham, and Paul T. Vickers, Royal Oak, Mich., assignors to General Motors Corporation, Detroit, Mich., a corporation of Delaware
Filed Jan. 16, 1956, Ser. No. 559,390
10 Claims. (Cl. 257—269)

This invention relates to rotary regenerators or heat exchangers and is particularly directed to providing improved mounting and sealing arrangements for such devices. While the invention is capable of use in various installations where heat transfer is required, it is particularly suited to the requirements of gas turbines. The invention is described in its preferred embodiment as part of a gas turbine engine. The engine, as such, is the subject of other patent applications.

The nature of the invention may be better appreciated by a brief description of the preferred embodiment in which the regenerator comprises a housing enclosing a matrix in the form of a drum which is provided with rims which cooperate with supporting rollers disposed at one side of the drum so that the regenerator housing and matrix may expand and contract relatively. The matrix passes at two points through a diaphragm fixed in the housing. Main seals are provided at these points to reduce, as far as practicable, flow of gas through the diaphragm. Each main seal comprises a primary seal which closely engages the inner and outer surface and the ends of the matrix. This main seal has a floating mounting in the diaphragm and is guided or located by the matrix so that it accommodates its position to that of the matrix. A flexible secondary seal is provided between the floating main seal and the diaphragm. A ring of rim seals engages each end of the matrix to prevent by-passing of gas around the ends.

The principal objects of the invention are to provide an improved rotary regenerator, to provide improved mounting and driving structure for a regenerator which accommodates expansion of the regenerator matrix relative to the housing, and to provide improved seals for the regenerator.

The nature of the invention and the advantages thereof will be clearly apparent from the succeeding detailed description of the invention and the accompanying drawings, in which:

FIGURE 2 is a sectional view illustrating the main seal, taken on the plane indicated by the line 2—2 in FIGURE 1;

FIGURE 3 is a transverse section through the regenerator matrix and rim seals, taken on the plane indicated by the line 3—3 in FIGURE 1;

FIGURE 4 is a partial rear elevation of the engine with parts cut away and in section, taken in the direction indicated by the line 4—4 in FIGURE 1;

Figure 1:
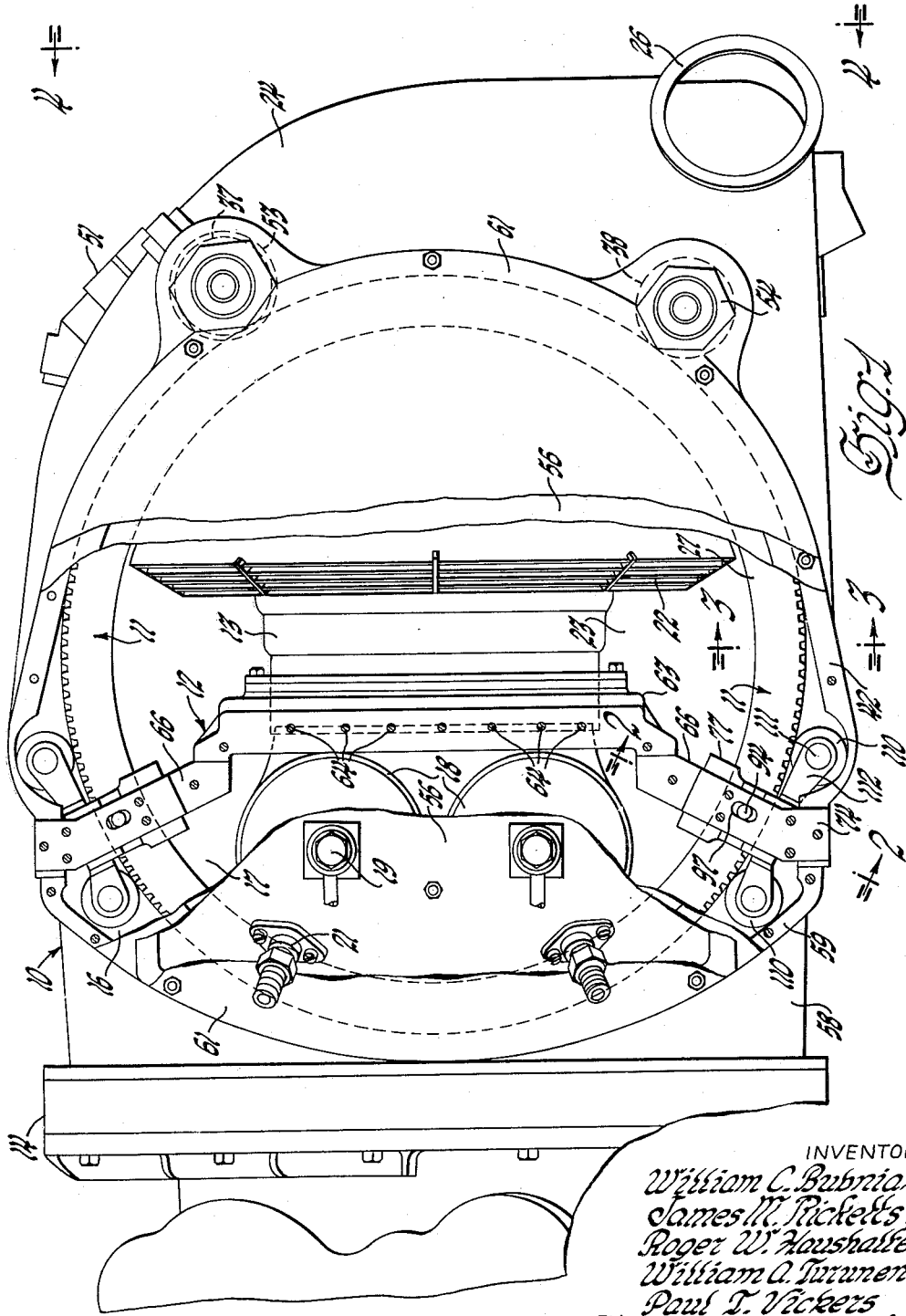
FIGURE 1 is a partial side elevation, with parts cut away, of a gas turbine engine including a regenerator embodying the invention.

The engine shown in FIGURES 1 and 4 is described in application No. 559,475, Regenerative Gas Turbine, filed January 16, 1956. So far as it is material to understanding the regenerator of this invention, it is described briefly herein.

The engine (FIG. 1) includes a housing indicated generally as 10 which encloses two rotary drum regenerator matrices 11 mounted for rotation about a common horizontal axis. There is one regenerator drum at each side of the engine with its individual sealing arrangements but, since the two are alike, only one will be described. The matrix passes at two points through a diaphragm or bulkhead, indicated generally as 12, which divides the housing 10 into first and second chambers, one on each side of the diaphragm. A gas turbine 13 is mounted in the diaphragm and defines a flow path through the diaphragm from the first chamber to the second chamber. A compressor 14 driven by the turbine delivers compressed air into a space within the housing ahead of the matrix, which may be termed the first space 16. This air flows inwardly through the matrix into a second space 17 between the matrix and diaphragm, being heated as it passes through the matrix. Combustion chambers 18 mounted in the space 17 and provided with fuel nozzles 19 and igniters 21 generate motive fluid and supply it to the turbine 13. The turbine exhausts through a retroverted diffuser 22 into a third space 23 behind the diaphragm and ahead of the matrix. The exhaust gases flow outwardly through the matrix into a fourth space enclosed by an exhaust collector 24 provided with an exhaust gas outlet 26. The matrix is rotated slowly, the part behind the diaphragm being heated by the exhaust gases and giving up the heat to the compressed air flowing from the first to the second space. Because of the greater density of the gas flowing from space 16 to space 17 relative to the gas flowing from space 23 to the exhaust collectors, the arc of the matrix ahead of the diaphragm is about half the length of the arc behind the diaphragm. It will be seen that the combustion apparatus and turbine are contained within the regenerator, the shaft which drives the compressor (not shown) extending forwardly through the space between the two drums 11.

Considering briefly the structure of the matrix illustrated in FIGURE 3, it may be noted that the preferred structure is the subject matter of U.S. Patent No. 2,937,010, and that the structure of the matrix as such is not material to the present invention except so far as it is suited for cooperation with the structure of the present invention. The matrix comprises end rings 27 defining the rims or edges of the matrix, between which is mounted heat exchange material 28, which may comprise metal plates fixed to layers of wire cloth to provide the desired heat absorbing capacity and permit free flow of gas radially through the matrix. The rings 27 are provided with dovetail grooves 29 into which the sheets 28 are interlocked in the assembly of the matrix. A ring gear 31 is shrunk or otherwise fixed on each ring 27, and each ring defines a circular track 32. The ring gears 31 cooperate with driving pinions for the matrix and the tracks 32 cooperate with supporting rollers.

The mounting and driving structure for the drum is shown principally in FIGURE 4. This is a rear view of the engine in which the exhaust collectors 24 are shown. A rear turbine cover plate 33 extending between the exhaust collectors and fixed at the top and bottom edges to the diaphragm 12 completes the rear part of the regenerator housing. It may be noted that a reduction gear 34 driven by the turbine 13 to supply power to an output shaft 36 is mounted between the exhaust collectors. The shaft of the turbine (not shown) passes between the regenerator drums to the reduction gear 34.

The regenerator matrix 11 is supported against the gas pressure loads by rollers 37 and 38 mounted respectively on shafts 39 and 41, the rollers bearing against the tracks 32 of the matrix. Shafts 39 and 41 are similarly mounted in the flanges 42 and 43 of the exhaust collector. Bearings 44 for the ends of the shafts are supported in cages 46 bolted to the side walls or flanges of the exhaust collector. Shaft 41 is an idler shaft. Shaft 39 includes an extension 47 which enters a drive case 48, and may be splined to a driving shaft (not shown) in case 48 which is driven at slow speed by a suitable reduction gearing in a case 49 powered by a motor 51, which may be a hydraulic motor supplied with operating fluid through a conduit 52. The nature of the power means for driving the matrix is immaterial so far as the present invention is concerned. It is preferably driven at about 10 to 60 revolutions per minute. Pinions 53 keyed to shaft 39 engage the ring gears 31 to drive the matrix. Rollers 37 prevent crowding of the pinion and ring gear due to gas pressure exerted on the matrix. The bearings 44 are covered by caps 54.

The outer or side wall of the regenerator housing is defined principally by a regenerator cover plate 56 which is approximately circular and provides a sufficiently large opening when it is removed to permit removal of the drum 11. This cover plate includes a marginal flange or plate 57 of relatively heavy section which is bolted to the outer flange 42 of the exhaust collector 24 behind the bulkhead 12. A front cover 58 (FIG. 1) extends from the compressor 14 to the covers 56 on the side and to the bulkhead 12 at the top and bottom and defines the front part of the regenerator housing (first space 16). Front cover 58 has a side flange 59 to which the front edge of the regenerator cover is bolted. A radiation shield 61 is bolted over and spaced from the regenerator cover and is substantially coextensive with it.

Figure 5:
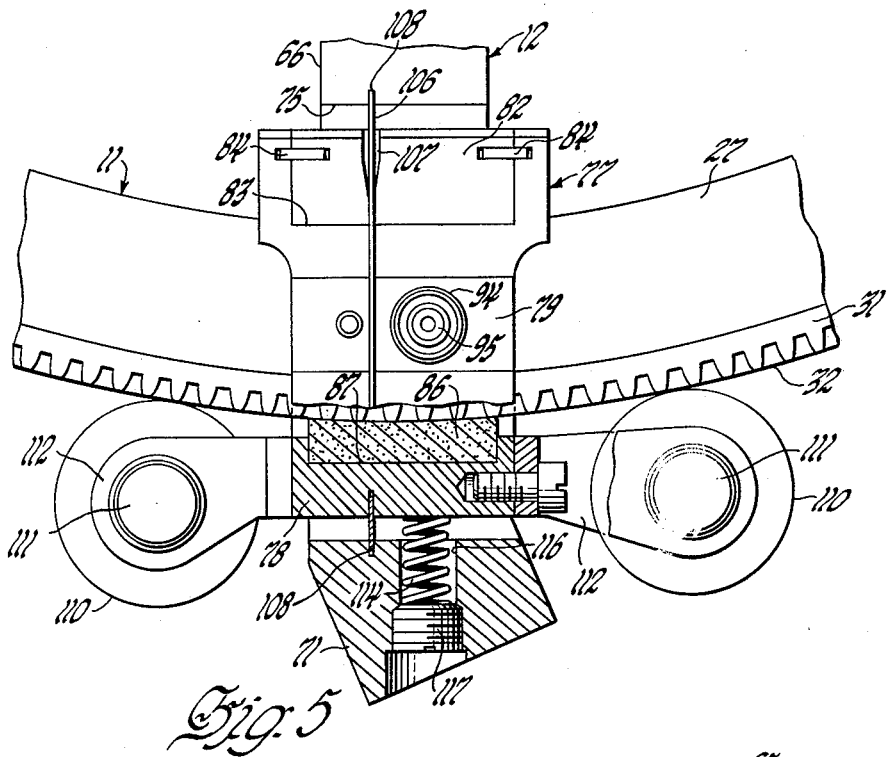
FIGURE 5 is a partial sectional view taken principally on the plane indicated by the line 5—5 in FIGURE 2.

Referring now to FIGURES 1 and 2 for the structure of diaphragm 12, this diaphragm comprises a main plate 63 which extends from side to side of the engine and mounts studs 64 to which the cover plate 56 is bolted. A heavy web 65 of the cover plate overlies the diaphragm. Inner seal bars 66 are bolted to the top and bottom edges of the main plate by bolts 67. A hollow block or box 68 open at the rear is mounted on each inner seal bar 66 by bolts 69. An outer seal bar 71 is fixed to the block 68 by bolts 72. The outer seal bars 71 define the upper and lower edges of the diaphragm and are provided with openings for bolts 73 by which the front cover 58, exhaust collectors 24, and rear plate 33 are fixed to the diaphragm. An end cap 74 mounted on the outer ends of the seal bars 66 and 71 and extending from one to the other completes the margin of the opening 75 through which the matrix 11 passes and in which the main seal assembly is mounted. Cap 74 is located by dowels 76 and is slidably mounted on these dowels. It may be noted that the main plate 63, inner seal bars 66, blocks 68, outer seal bars 71, and end caps 74 when assembled define the rigid bulkhead 12. FIG. 5 is an end view of the main seal as it would appear with the end cap 74 removed.

The main seal comprises a rectangular frame 77 of a primary seal assembly mounted with clearance for radial and lateral movement in the opening 75. The frame 77 comprises an outer side bar or shoe 78 and edge members or legs 79 and 81 integral with bar 78. An inner side bar or shoe 82 is mounted on the inner ends of the legs 79 and 81 and may be put in place after the other parts of the frame have been put over the matrix. Inner shoe 82 is slidably mounted in slots 83 in the legs 79 and 81 so it can expand freely relative to outer shoe 78, which runs much cooler when the regenerator is in operation. Keys 84 inserted in keyways cut in the shoe 82 and the legs 79 and 81 hold the shoe 82 against radially inward displacement. Sealing segments 86 are mounted in grooves 87 extending across the faces of bars 78 and 82 by screws 89, the heads of which engage countersunk holes in the segments. These segments are of graphite or a similar material having good heat resistance and relatively low sliding friction. The seal segments are spaced with very slight clearance, indicated at 91, from the active material 21 of the matrix but may slidably engage the edge portions or rims 27 of the matrix. An outer edge seal segment 92 of similar material to segments 86 is mounted in a groove in the inner surface of leg 79 to bear against the outer edge of the matrix. The inner edge of the matrix is engaged by a graphite block 93 which is slidably mounted so that it may be urged against the inner edge of the matrix.

The primary seal assembly 77 is floatingly mounted in the seal bar assembly by needle bearings 94 and 96 which permit rocking movement of the seal assembly and may also move radially of the matrix in slots 97 and 98 in the end cap 74 and the end wall of the block 68, respectively. Bearing 94 is mounted on a trunnion 95 extending from the leg 79 and bearing 96 is mounted on a hollow trunnion 99 threaded through the leg 81 and locked in place by nut 101.

A secondary seal is provided between the primary seal assembly and the seal bar assembly by a rectangular frame 106 which is made of two thin sheets of flexible material such as shim stock. Each of the frames of shim stock is cut across at one end so that it may be assembled over the frame 77. The shim stock extends into a narrow sawcut 107 extending around the entire periphery of the primary seal frame 77 and a similar sawcut 108 in the members 66, 68, 71, and 74 which enclose the primary seal. The depth of these sawcuts is great enough to allow some clearance for radial movement of the primary seal relative to the seal bar assembly and the flexibility of the shim stock, in connection with the gaps between the primary seal and the seal bar, allows slight rocking movement of the primary seal. It will be understood that the sawcuts are of sufficient width to permit free movement of the shim stock. A contact seal is maintained, however, because of the fact that the pressure on one side of the shim stock is considerably higher than that on the other due to the pressure drop through the turbine. The sawcut 107 is chamfered at the corners of the frame 77 to facilitate insertion of the secondary seal and to reduce stress concentration therein. The sawcut 108 in the block is also chamfered for the same reasons. The secondary seal 106 is slightly displaced circumferentially of the matrix from the trunnion bearings 94 and 96.

The primary seal assembly 77 is properly oriented with the matrix 11 by four rollers 110, two of which ride on each of the surfaces 32 of the matrix. These rollers are the outer races of roller bearings mounted on shafts 111 mounted in clevis arms 112 bolted to the frame of the primary seal.

The rollers 110 are held in engagement with the track 32 on the outer surface of the matrix, and thus the main seal is properly aligned with the matrix, by the force exerted by eight coil springs 114 (FIGURE 5) mounted in pockets 116 in the outer seal bar 71. Two of these spring pockets are located between adjacent bolts 73. The springs bear against the outer surface of the seal shoe 78 and are retained by threaded plugs 117 which provide an abutment for the springs and may be removed to take out the springs when the matrix is to be removed from the engine. The springs also serve to support the matrix, together with the rollers 37 and 38, when the engine is not in operation, and thus keep the weight of the matrix from bearing against the secondary seal 106. When the engine is in operation, the slight pressure drop resulting from the rearward flow through the matrix exerts a rearward force on the matrix. A larger force, due to the pressure drop through the turbine acting on the cross-sectional area of the matrix also urges the matrix rearwardly, so that the matrix is carried by the rollers when the engine is in operation. Under this condition, the springs 114 merely serve to aid in locating the primary seal accurately. In conjunction with the rollers 110, they prevent any cocking of the seal relative to the matrix which would tend to cause binding or dragging of the seal. The springs 114 are in the same radial plane relative to the center of the matrix as the trunnions 94 and 96.

Since the trunnion bearings 94 and 96 are in a hot environment, provision is made for cooling these bearings.

Figure 6:
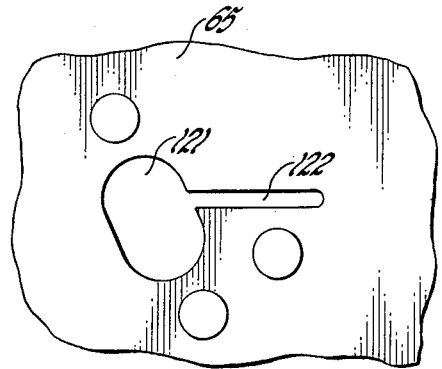
FIGURE 6 is a fragmentary view taken on the plane indicated by the line 6—6 in FIGURE 2.

Referring to FIGURES 2 and 6, the web 65 of the regenerator cover plate which overlies the diaphragm is recessed to provide a chamber 121 in the inner wall thereof which overlies the opening 97 in the end cap 74 in which trunnion bearing 94 is located. A slot 122 in the web 65 extends forwardly from the chamber 121 into communication with the space 16 ahead of the matrix. Compressor discharge air flows through slot 122 over the outer surface of end cap 74 into chamber 121, over the trunnion bearing 94, and into space 23. This flow is maintained by the pressure drop through the turbine.

The inner trunnion bearings 96 are similarly cooled by air flowing through drilled passages 126 in the lower web of the block 68 which open at the forward face of the block and which connect to drilled passages 127 in the outer side web of the block opening into the slot 98 for the inner trunnion 96. This air flows through the passage 126, 127 and cools the bearing and exhausts through the space between the main seal frame and the opening in which it is mounted.

As previously stated, the inner edge seal blocks 93 are resiliently urged against the inner edge of the matrix and thus urge the matrix against the outer edge seal 92. This biasing of the seals is accomplished by a compression spring 140 mounted in the hollow interior of block 68 between spring retainers 141. The retainers engage the ends of pins 142 which are slidably mounted in the hollow bearing trunnions 99 and have heads 143 seated in recesses 144 in the outer faces of the seal blocks 93. The pins 142 pass through flexible buttons 146 which cover the openings 98 and which may slide radially with movement of the seal.

It will be apparent to those skilled in the art that the main seal structure is particularly suited to accomplishing the desired end of minimizing leakage through the main seal from the high pressure side to the low pressure side. Such leakage, of course, is detrimental to the efficiency of the engine. Because of the floating mounting of the main seal and the manner in which it is guided by the matrix, very close tolerances between the inner and outer sides of the matrix and the graphite seal blocks 86 is feasible. The relatively expansible mounting of the inner shoe 82 which prevents bowing of the seal frame also aids in maintaining close clearances. The edge seals 92 and 93 may be in direct contact with the matrix and are held in such contact by the spring 140. The secondary seal 106 permits rocking or radial movement of the primary seal and provides an effective seal against leakage around the main seal.

Rim or bypass seals engaging the edges of the matrix are provided to minimize leakage of gas past the edges of the matrix and thus force substantially all of the gas to flow through the matrix. Each rim seal comprises two arcs, a forward arc ahead of the main seal and a rear arc behind the main seal. There is a very short gap in the rim seals at the main seal. The structure of these seals is shown in FIGURE 3, which is a cross-sectional view taken through the rim seals of the rear arc. Considering first the outer edge rim seal assembly 150, this comprises a ring 151 of approximately 240 degrees arcuate extent providing within it an undercut slot 152 within which are mounted short flanged arcuate sealing segments 153 of graphite or a similar material. Each segment 153 is biased into contact with the edge of the matrix by two small coil springs 154 mounted in pockets in the strip 151. The springs may be inserted through the gap in the inner edge of the ring and the segments can be slid in from either end of the ring. The supporting ring 151 is fixed to the outer flange 57 of the exhaust collector by screws 156. The inner edge rim seal assembly 160 is substantially identical, the difference being that the support 161 for this seal is integral with a flange 162 which extends between the flange 43 of the exhaust collector and the outer flange of the rear turbine cover 33, fixed together by bolts 164. Rim seals 150 and 160 are also visible in FIGURE 4. The front rim seals are similar in structure to the seals just described. The outer rim seal is bolted to the inside of regenerator cover plate 56. The inner rim seals are bolted to an arcuate plate (not shown), generally similar to rear plate 33, which extends between the edges of the regenerator matrices ahead of the bulkhead 12 and is bolted to the blocks 68. This plate provides a wall between the two regenerator drums, as well as mounting the inner rim seals, and thus prevents flow of air through the space between the drums from the compressor to the combustion apparatus. Because of the spring-urged segments, the rim seals can seat closely against the edges of the matrix and minimize bypassing of the matrix while accommodating any dimensional changes.

In the assembly of the regenerator, the inner rim seals are mounted in the engine. The main seal shoes 78 are placed over the matrix and the main seals completed by the addition of the inner seal shoe 82. The secondary seal 106 is then mounted in the sawcut in the main seal. The bearing cages for shafts 39 and 41 may be removed to permit rearward displacement of the shafts to facilitate insertion of the matrix. The matrix may then be moved into the housing in the opening 75 of the seal bars. The secondary seals 106 slide into the sawcut 108 in the seal bar assembly; the bearings for shafts 39 and 41 are put back in place; and then springs 116 may be inserted and plugs 117 put into place behind them. The end caps 74 of the seal bar assemblies are then slid into place. It will be noted (FIGURE 2) that one of the bolts 73 which passes through the front cover and exhaust collector flanges passes through the end cap 74, thus fixing it in place relative to the outer seal bar 71. The regenerator cover 56, bearing the outer rim seals, may then be mounted, and since it bolts over studs 64 extending from the main plate 63, the inner seal bar 66, and the end cap 74, this also serves to hold the end cap in place.

The operation of the regenerator will be apparent from the foregoing detailed description and need not be repeated.

The advantages of the invention will be clear from the foregoing detailed description of the preferred embodiment. These include the generally floating mounting of the regenerator matrix providing for expansion relative to the case, the floating mounting of the seals which also provides for thermal expansion or distortion, the structure of the main seal which provides minimum clearances and leakage, and the cooling arrangements for the main seal trunnions. It will also be appreciated that the structure is well adapted to easy assembly and inspection or replacement of parts and particularly suited for incorporation in a compact gas turbine power plant.

The detailed description of the preferred embodiment of the invention for the purpose of explaining the principles thereof is not to be regarded as limiting the invention, as many modifications may be made by the exercise of skill in the art within the scope of the invention.

We claim:

1. A rotary regenerator comprising, in combination, a housing, a diaphragm dividing the interior of the housing into first and second chambers, an annular matrix rotatably supported in the housing and passing through the diaphragm, seals movably mounted in the diaphragm sealing against the matrix where it passes through the diaphragm at spaced points on one side of a diameter of the matrix, each seal including a frame encircling the matrix, means movably mounting the seals to provide for relative expansion of the housing and matrix, locating means on the seal frames engaging the matrix to align the seals with the matrix, supporting and guiding means for the matrix mounted in the housing and engaging the matrix at points spaced circumferentially thereof on the other side of the said diameter of the matrix, and means resiliently biasing the seal frames radially inwardly of the matrix.

2. A rotary regenerator comprising, in combination, a housing, a diaphragm dividing the interior of the housing into first and second chambers, an annular matrix rotatably supported in the housing and passing through the diaphragm, seals movably mounted in the diaphragm sealing against the matrix where is passes through the diaphragm at spaced points on one side of a diameter of the matrix, each seal including a frame encircling the matrix, means movably mounting the seals to provide for relative expansion of the housing and matrix, locating means on the seal frames engaging the matrix to align the seals with the matrix, and supporting and guiding means for the matrix mounted in the housing and engaging the matrix at points spaced circumferentially thereof on the other side of the said diameter of the matrix.

3. A rotary regenerator comprising, in combination, a housing, a diaphragm dividing the interior of the housing into first and second chambers, an annular matrix rotatably supported in the housing and passing through the diaphragm, main seals mounted in the diaphragm sealing against the matrix where it passes through the diaphragm, each main seal comprising a primary seal engaging the matrix, and including a frame encircling the matrix, means movably mounting the primary seal frame comprising parts extending therefrom and guide means for the parts on the housing, locating means on the primary seal frame engaging a radially directed surface of the matrix to align the primary seal with the matrix and a secondary seal between the primary seal frame and the diaphragm.

4. A rotary regenerator comprising, in combination, a housing, a diaphragm dividing the interior of the housing into first and second chambers, an annular matrix rotatably supported in the housing and passing through the diaphragm, main seals mounted in the diaphragm sealing against the matrix where it passes through the diaphragm, each main seal comprising a primary seal engaging the matrix and including a frame encircling the matrix, means movably mounting the primary seal frame comprising trunnions extending therefrom and guide means for the trunnions on the housing, locating means on the primary seal frame engaging the matrix to align the primary seal with the matrix comprising arms extending from the seal frame circumferentially of the matrix and rollers on the arms engaging a radially-directed surface of the matrix, and a secondary seal between the primary seal frame and the diaphragm.

5. A rotary regenerator comprising, in combination, a housing, a diaphragm dividing the interior of the housing into first and second chambers, an annular matrix rotatably supported in the housing and passing through the diaphragm, main seals mounted in the diaphragm sealing against the matrix where it passes through the diaphragm, each main seal comprising a primary seal engaging the matrix and including a frame encircling the matrix, means movably mounting the primary seal frame comprising trunnions extending therefrom and guide means for the trunnions on the housing, locating means on the primary seal frame engaging the matrix to align the primary seal with the matrix comprising arms extending from the seal frame circumferentially of the matrix and means on the arms engaging a radially-directed surface of the matrix, and a yieldable secondary seal between the primary seal frame and the diaphragm comprising a flexible plate encircling the seal frame extending into a circumferential slot in the primary seal frame and into slots in the diaphragm facing the said circumferential slot.

6. A rotary regenerator comprising, in combination, a housing, a diaphragm dividing the interior of the housing into first and second chambers, an annular matrix rotatably supported in the housing and passing through the diaphragm, main seals mounted in the diaphragm sealing against the matrix where it passes through the diaphragm, each main seal comprising a primary seal engaging the matrix and including a frame encircling the matrix, means movably mounting the primary seal frame, and a yieldable secondary seal extending from the primary seal frame to the diaphragm comprising a flexible plate encircling the seal frame extending into a circumferential slot in the primary seal frame and into slots in the diaphragm facing the said circumferential slot.

7. A rotary regenerator comprising, in combination, a housing, a diaphragm dividing the interior of the housing into first and second chambers, an annular matrix rotatably supported in the housing and passing through the diaphragm, and a seal mounted in the diaphragm sealing against the matrix where it passes through the diaphragm, the matrix being of rectangular cross section with two faces and two edges substantially shorter than the faces, one face being normally much hotter than the other in operation of the regenerator, the seal comprising a rectangular frame enclosing the matrix, the sides of the frame confronting the faces of the matrix being connected with provision for relative expansion of said sides lengthwise of the sides to obviate thermal bowing of the frame.

8. A rotary regenerator comprising, in combination, a housing, a diaphragm dividing the interior of the housing into first and second chambers, the chambers containing gas at different pressures in operation of the regenerator, an annular matrix rotatably supported in the housing and passing through the diaphragm, seals mounted in the diaphragm sealing against the matrix where it passes through the diaphragm, each said seal including a frame encircling the matrix, trunnion means movably mounting the seal frames, and means providing passages in the housing for leading gas from the first chamber to the second chamber over the trunnion means for cooling the trunnion means.

9. A rotary regenerator comprising, in combination, a housing, a diaphragm dividing the interior of the housing into first and second chambers, the chambers containing gas at different pressures in operation of the regenerator, an annular matrix rotatably supported in the housing and passing through the diaphragm, seals mounted in the diaphragm sealing against the matrix where it passes through the diaphragm, each said seal including a frame encircling the matrix, trunnion means on the seal frames and guide means for the trunnion means in the housing rotatably and translatably mounting the seals, and means providing passages for leading gas from the first chamber to the second chamber over the trunnion means for cooling the trunnion means.

10. A rotary regenerator comprising, in combination, a housing, a diaphragm dividing the interior of the housing into first and second chambers, an annular matrix rotatably supported in the housing and passing through the diaphragm and having an axis shiftable in the housing, main seals on the diaphragm sealing against the matrix, the first chamber containing fluid under pressure and the second chamber containing fluid under lower pressure when the regenerator is in operation, and matrix supporting means fixedly located in the second chamber engaging the perimeter of the matrix at two circumferentially spaced points of the circumference thereof, whereby the net force exerted on the matrix by the fluid in the said chambers urges it against the supporting means, means on the main seals cooperating with the matrix to align the seals with the matrix, and means movably mounting the seals for movement radially of the matrix and rotation about an axis parallel to the axis of the matrix.

References Cited in the file of this patent

UNITED STATES PATENTS 1,722,788   Cook  ------------------ July 30, 1929
2,294,214   Seinfeld  -------------- Aug. 25, 1942

(Other references on following page)

UNITED STATES PATENTS

| | | | |
|---|---|---|---|
| 2,469,078 | Robison | May 3, | 1949 |
| 2,517,470 | Erisman | Aug. 1, | 1950 |
| 2,605,646 | Karlsson et al. | Aug. 5, | 1952 |
| 2,631,870 | Hodson | Mar. 17, | 1953 |
| 2,643,097 | Bowden et al. | June 23, | 1953 |
| 2,667,034 | Alcock | Jan. 26, | 1954 |
| 2,743,945 | Bentele et al. | May 1, | 1956 |
| 2,747,843 | Cox et al. | May 29, | 1956 |
| 2,803,508 | Nilsson et al. | Aug. 20, | 1957 |

FOREIGN PATENTS

| | | | |
|---|---|---|---|
| 84,778 | Norway | Dec. 27, | 1954 |
| 543,093 | Great Britain | Dec. 27, | 1954 |
| 704,857 | Great Britain | Mar. 3, | 1954 |